(12) United States Patent
Cella Mazzariol et al.

(10) Patent No.: US 10,960,443 B2
(45) Date of Patent: Mar. 30, 2021

(54) METHOD AND PLANT FOR WASTE DISPOSAL

(71) Applicant: ENTSORGAFIN S.P.A., Tortona (IT)

(72) Inventors: Pietro Paolo Cella Mazzariol, Tortona (IT); Gian Francesco Galanzino, Tortona (IT)

(73) Assignee: ENTSORGAFIN S.P.A., Tortona (IT)

( * ) Notice: Subject to any disclaimer, the term of this patent is extended or adjusted under 35 U.S.C. 154(b) by 0 days.

(21) Appl. No.: 16/625,079

(22) PCT Filed: Jun. 14, 2018

(86) PCT No.: PCT/IB2018/054383
§ 371 (c)(1),
(2) Date: Dec. 20, 2019

(87) PCT Pub. No.: WO2018/234950
PCT Pub. Date: Dec. 27, 2018

(65) Prior Publication Data
US 2020/0215592 A1    Jul. 9, 2020

(30) Foreign Application Priority Data

Jun. 20, 2017   (IT) .......................... 102017000068623

(51) Int. Cl.
*B09B 3/00*     (2006.01)
*B01D 53/85*    (2006.01)
(Continued)

(52) U.S. Cl.
CPC ................ *B09B 3/00* (2013.01); *B01D 53/85* (2013.01); *C02F 3/06* (2013.01); *C02F 2103/06* (2013.01)

(58) Field of Classification Search
CPC ........ B01D 53/85; C02F 3/06; C02F 2103/06; B09B 3/00
See application file for complete search history.

(56) References Cited

U.S. PATENT DOCUMENTS 7,955,419 B2 * 6/2011 Casella ................. B01D 53/38
405/129.1
2004/0152185 A1 8/2004 Egan et al.
(Continued)

FOREIGN PATENT DOCUMENTS

WO     02/089959 A1    11/2002

OTHER PUBLICATIONS

International Search Report and Written Opinion of the International Searching Authority dated Jul. 26, 2018 for International Patent Application No. PCT/IB2018/054383.

*Primary Examiner* — Gautam Prakash
(74) *Attorney, Agent, or Firm* — Howson & Howson LLP

(57) ABSTRACT

A method and plant for waste disposal are provided. A recirculating arrangement recirculates leachates generated by the processes of waste treatment into the plant itself, namely into a biofilter. The leachates are treated without need for providing a dedicated arrangement for purification and disposal. In addition, the recirculated leachates introduced into the biofilter represents an additional irrigation system for the filtering material of the biofilter and contributes to maintain its humidity advantageously high. Preferably, the leachates are introduced into the biofilter at an intermediate height of the biofiltering material bed, so as to obtain a kind of "submerged irrigation" of the biofilter. More preferably, the leachates are introduced into the biofilter as homogeneously and dispersedly as possible, so as to obtain a kind of "micro-irrigation" system for the biofilter.

18 Claims, 4 Drawing Sheets

(51) Int. Cl.
*C02F 3/06* (2006.01)
*C02F 103/06* (2006.01)

(56) References Cited

U.S. PATENT DOCUMENTS

2008/0314828 A1 12/2008 Campbell
2012/0015430 A1 1/2012 Christensen

* cited by examiner

METHOD AND PLANT FOR WASTE DISPOSAL

TECHNICAL FIELD OF THE INVENTION

The present invention relates to a method for waste disposal and to a corresponding plant for carrying out said method.

More particularly, the present invention relates to a method and plant for waste disposal which provide for treatment of leachates generated by said waste.

Prior Art

Plants for waste disposal are known and widely spread. They can be based on several processes of either aerobic or anaerobic treatment of waste. By way of example, methods and plants for bio-drying, composting, anaerobic digestion, mechanical treatment (MRF—Material Recycling Facilities), biomass treatment may be mentioned.

For instance, in case of plants for waste disposal based on a process of bio-oxidation, said process of bio-oxidation provides that waste, arranged in heaps, is aerated, so that bacteria can begin a decomposition process, thus developing heat and entailing a temperature increase. The process is initiated by mesophilic microbial species and successively, when the temperature has been sufficiently increased, by thermophilic microbial species.

In a plant for waste disposal of the above-mentioned type, it is necessary to eliminate unpleasant odours generated by the waste and by its treatment by means of bio-filtering, which is a process of bio-chemical oxidation carried out by aerobic microorganisms on the airborne and often malodorous polluting organic compounds called VOCs (volatile organic compounds).

Such need arises not only in case of plants for waste disposal based on bio-oxidation of waste, but also—more generally—in all those plants in which waste treatment entails the production of unpleasant odours.

In order to meet this need, said plants are provided with a station for biofiltering air. The biofiltering process is based on the transfer of VOCs from the aeriform effluents in which they are contained to a solid, which is maintained humid and in which VOCs are degraded by the microorganisms present therein. The process is aerobic and exothermic and the biochemical action of the microbial population gives rise to the conversion of the contaminants into carbon dioxide, water, inorganic compounds and biomass.

The biofiltering device (biofilter) is a device capable of capturing, by diffusion and adsorption, the molecules of pollutants in the aeriform effluent to be treated and subjecting them to biological decomposition by means of the microbial population.

The aeriform effluents produced in the station of waste treatment are therefore conveyed to the biofiltering station, pass through the filtering material of the biofilter, where they undergo the metabolic action of the microbial population, and leave, so treated, the biofiltering station to be directly introduced into the atmosphere.

Besides the aforesaid aeriform effluents, waste treatment also generates liquid effluents, the so-called leachates, consisting of the ensemble of sewage that is formed during the different process steps to which the waste is subjected and which include not only the steps of waste treatment properly said, but also the steps of transport and storage of said waste.

More particularly, leachates may be produced during discharge and storage of waste by mechanical action, due to the possible pressing caused by the employed machines (which cause the liquid part to be squeezed with consequent generation of leachates) as well as to the weight of the waste itself.

Furthermore, there may be areas of the plant contaminated by the presence or passage of waste that are exposed to meteoric precipitations: such meteoric precipitations, once contaminated, are considered equivalent to leachates and, as such, they are collected and disposed of.

Also waters used for washing areas potentially contaminated by waste are considered equivalent to leachates and treated in the same way.

Furthermore, in the case in which, for example, waste treatment entails an anaerobic digestion step, leachates are produced during said step.

The same applies to the case of waste composting.

According to prior art, said leachates are disposed of by purifying them from pollutants and, once purified, by re-introducing them into the external environment.

Leachates are some of the most difficult sewage to purify: the difficulty is due not only to the amount of polluting compounds contained in them, but also to the variability of their composition: leachates may have very different chemical compositions depending on many parameters, including the type of waste by which they are generated; the characteristics of the leachates are usually defined using some indicators including pH, BOD (Biochemical Oxygen Demand), COD (Chemical Oxygen Demand) and metal content. Furthermore, the composition of the leachates may vary over time; indeed, the polluting compounds of the leachates, besides deriving from the nature and composition of the waste, are the result of the chemical, physical and biological processes of the decomposition that take place over time.

Furthermore, the difficulty in forecasting the volume of produced leachates, which can only be determined after collection in the appropriate tanks, makes the problem even more complex during the design step.

The problem of the disposal of leachates is also made more complex by the increasingly stringent regulations on emissions and respect for the environment.

Plants for the disposal of leachates are known which implement different types of treatment before re-introduction into the external environment, depending on the purification efficiency required by the regulations in force. In detail, plants implementing biological, aerobic, anaerobic and chemical-physical treatments are known.

Regardless of the implemented strategy, disposal of leachates is however an expensive method that requires the construction of dedicated processing stations, which, in many cases, also require an additional pre-treatment station.

The main object of the present invention is therefore to provide a method for waste disposal, as well as a plant for carrying out said method, allowing to avoid disposal of leachates into the external environment and the consequent need for providing one or more dedicated stations.

A further object of the invention is to provide a method and a plant for waste disposal involving a treatment of the leachates generated by said waste allowing to reduce the treatment and handling costs.

These and other objects of the invention are achieved by a method and a plant for waste disposal as claimed in the appended claims.

SUMMARY OF THE INVENTION

Thanks to the fact that the method and plant for waste disposal according to the invention provide for recirculating the leachates into the biofilter that is used for filtering the aeriform effluents generated by the treated waste, the need for a dedicated station for purifying the leachates before reintroducing them into the external environment can be avoided.

Recirculating the leachates into the biofilter also allows to obtain remarkable additional advantages.

Indeed, humidity in the biofilter is an important parameter for a good operation of said biofilter, since the microorganisms contained therein can survive and feed themselves (thus absorbing the contaminants) only in an environment having a high percentage of relative humidity.

In addition, the wetting degree of the biofilter is also essential because the polluting compounds pass from the gaseous phase to the liquid phase (absorption) more easily and quickly with respect to the adsorption in solid phase.

During operation, the humidity of the biofilter tends to decrease: evaporation of water absorbed by the filtering material of the biofilter is due both to the exothermic activity of the microorganisms and to the action of the aeriform effluents passing through the filtering material.

For the above reason, it is important that the humidity value is monitored and that the biofiltering station is capable of automatically reintegrating the liquid.

As a consequence, recirculating the leachates into the biofilter advantageously contributes to maintaining the proper humidity of the biofilter itself, while preferably co-operating with a traditional irrigation system which is normally provided.

In a preferred embodiment of the invention, recirculating of the leachates takes place by means of pipes arranged in a same plane and aligned with one another, which pipes are fed from a manifold collecting the leachates coming from the plant for waste disposal, and more particularly the leachates generated by the wasted treated in the waste treatment station.

Preferably, said pipes are arranged at an intermediate height in the biofilter, thus obtaining a kind of "submerged irrigation" of the biofilter.

For instance, they can be laid on a layer of filtering material and covered by a further layer of filtering material.

In an alternative embodiment, said pipes may be arranged in more planes, with the interposition of corresponding layers of filtering material.

In a preferred embodiment of the invention, said pipes are made as drip pipes, i.e. pipes provided with a very high number of small holes, thus carrying out a kind of "micro-irrigation" of the biofilter.

BRIEF DESCRIPTION OF THE DRAWINGS

Further features and advantages will become more evident from the detailed description of a preferred embodiment of the present invention, given by way of non-limiting example, with reference to the attached drawings, in which.

DETAILED DESCRIPTION OF A PREFERRED EMBODIMENT OF THE INVENTION

Figure 1:
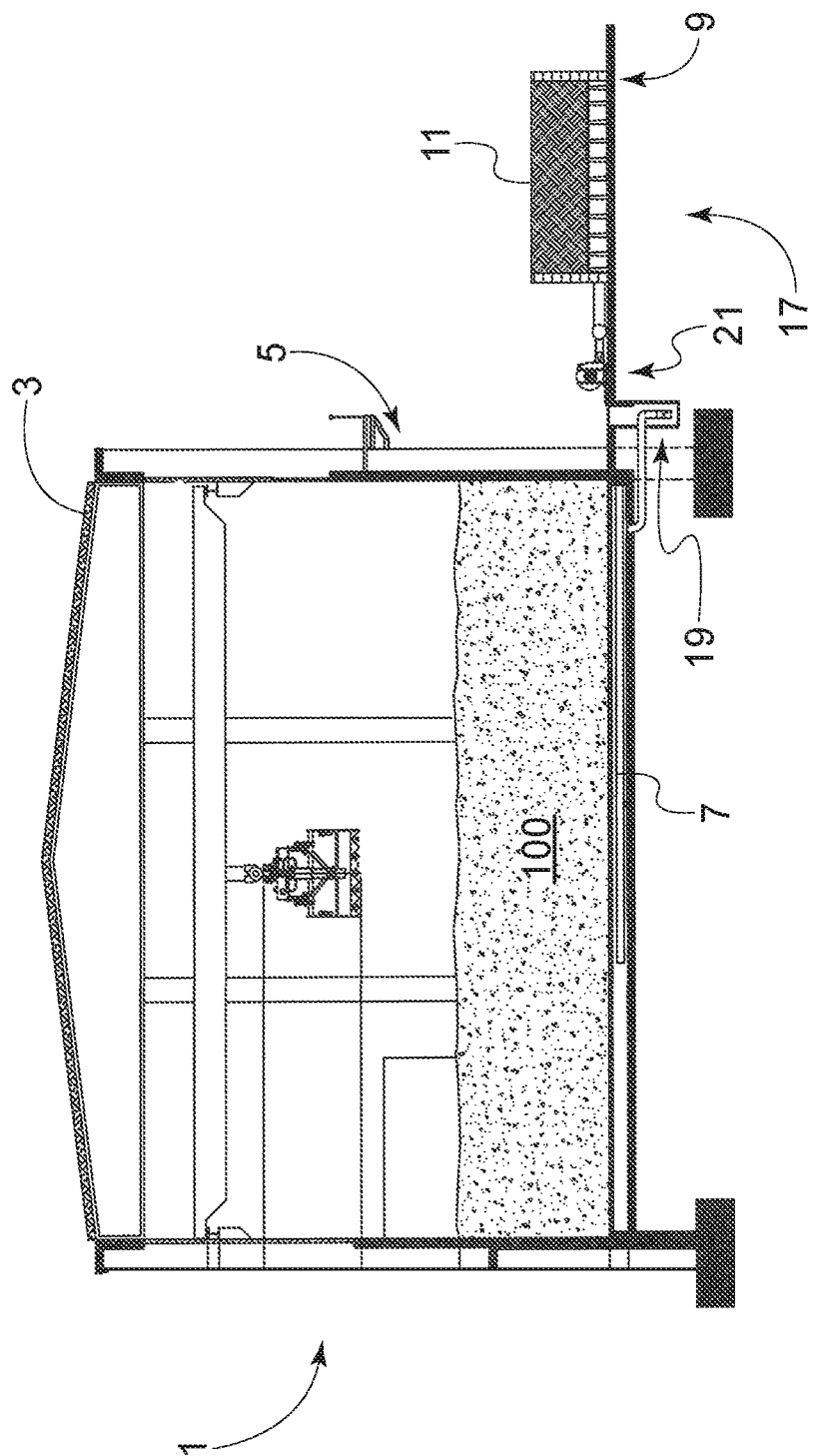
FIG. 1 is a schematic illustration in a cross-sectional view of the plant for waste disposal according to a preferred embodiment of the present invention.

With reference to FIG. 1, a plant for waste disposal 1 is schematically shown. Preferably, the matrix of the waste disposed of in the plant 1 has a content of putrescible organic matter higher than 5%.

Although in the described embodiment said plant is based on a process of bio-oxidation for the waste treatment, said embodiment is in no way to be intended as limiting, and the invention could also be applied to methods/plants for waste disposal including processing steps/working stations of a different type (composting, anaerobic digestion, mechanical treatment, and so on).

Said plant is mainly received inside an enclosure 3, in which waste is stored and treated. More particularly, according to the shown embodiment, FIG. 1 shows a bio-oxidation station 5 of the plant 1, in which bio-oxidation of waste takes place, said waste being arranged in heaps 100 on an aerated flooring 7 of the enclosure 3.

Said bio-oxidation process is known and, therefore, it will be only briefly described here. The bio-oxidation process provides that the waste, arranged in heaps, is aerated, so that bacteria can begin a decomposition process, thus developing heat and causing a temperature increase.

Said bio-oxidation process is achieved in two main steps, a mechanical pre-treatment step (for instance, by rough mechanical grinding of the waste as such or after mixing the organic waste with a structuring material), in order to increase the evaporation and mass-exchange surface of the waste, thus obtaining an acceleration of the bio-oxidation processes, and a biological treatment step of the previously ground matrix. This second step takes place by means of forced aeration of the biomass, by exploiting the heat developed by the aerobic biological reactions.

The initial decomposition of the substrate is due to the intervention of mesophilic microbial species (25-35° C.), which quickly use the soluble and easily degradable compounds. The heat generated by the metabolism of said microorganisms is trapped in the waste heap because of the poor conductivity of the waste. Following the progressive accumulation of heat, the temperature of the waste heap begins to increase, quickly rising above the threshold for termophilia: as soon as the temperature exceeds 40° C., the mesophilic microorganisms become less competitive and, therefore, they are progressively substituted by thermophilic species.

The optimum temperature range in which these microorganisms grow is between 55° C. and 65° C. During these step, high temperatures accelerate the degradation of proteins, lipids and complex carbohydrates, such as cellulose and hemicellulose.

The microorganisms carrying out the biological decomposition of the waste require high amounts of oxygen.

If the oxygen supply is scarce, the bio-oxidation process slows down, whereby oxygen concentrations not lower than 10% should be guaranteed in the waste heap.

The bio-oxidation process reduces the humidity of the waste and it has two essential objectives: guaranteeing the biological stability of the waste for long-term storage and sanitizing the waste, as well as producing a good substrate to be used as energy source (high calorific value).

The final, bio-oxidized product, obtained after a refining step, having a good calorific value, can be used as fuel in incineration plants, in which heat generated by the combustion is used for home heating or is converted into other forms of energy.

As far as the provision of oxygen is concerned, in order to properly aerate the waste heap 100, said heap is arranged on an aerated flooring 7, through which air can be blown into said heap and/or sucked through it and which allows a low-speed homogeneous distribution of air within said heap.

The air, after passing through the waste heap, is either recirculated inside the plant (for a further passage through the heap) or filtered for removing the polluting and malodorous organic compounds (VOCs) contained in it.

To this purpose, in a per se known manner, the plant 1 comprises a biofiltering station 9 comprising a biofilter 11, through which the air coming from the bio-oxidation station 5 passes before being released into the external environment.

Forced aeration means are provided for driving the air from the bio-oxidation station 5 to the biofiltering station 9 and for driving the air through the biofilter.

In a per se known manner, the biofilter 11 may comprise, for instance, a filtering bed formed by a layer of filtering material consisting of a mixture of the final product of the composting process of "green waste" only (freed from impurities such as paper, paperboard and plastic and with a particle size of 2.5-12 cm) and poplar bark and having a height comprised between 1.4 m and 2.0 m.

Figure 3:
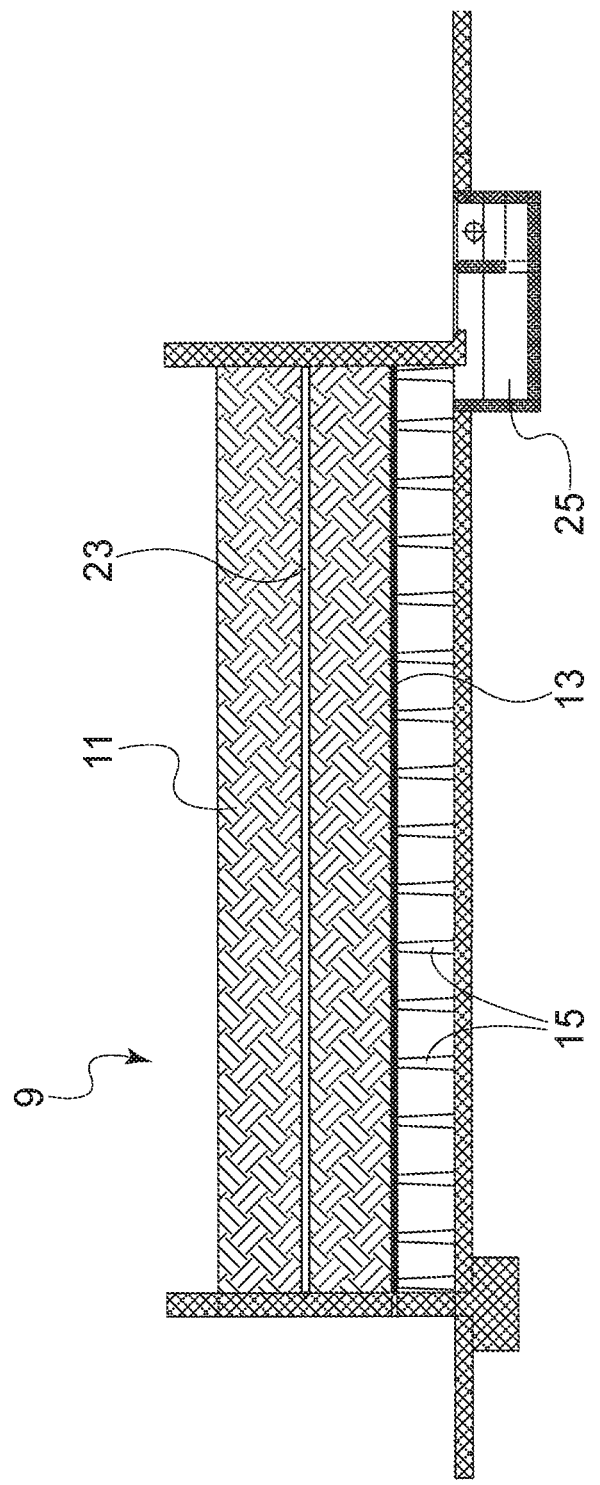
FIG. 3 is a cross-sectional view of the biofiltering station of FIG. 2.
Figure 4:
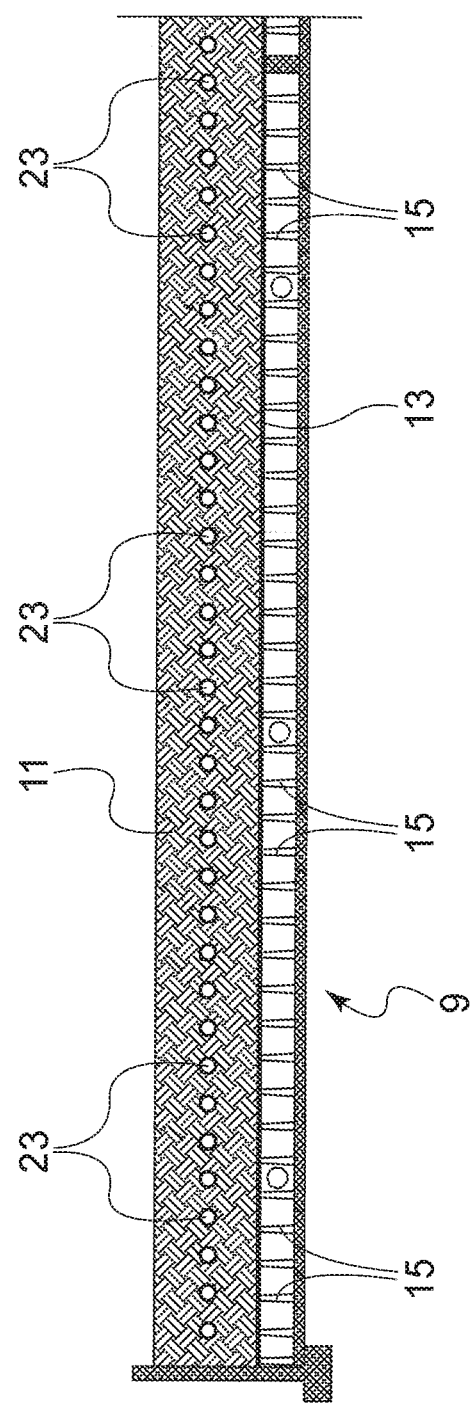
FIG. 4 is a longitudinal sectional view of the biofiltering station of FIG. 2.

Said filtering bed is preferably arranged on a flooring formed by gridded tiles 13 made of glass fiber reinforced polypropylene and lying on frusto-conical supports 15, also made of glass fiber reinforced polypropylene (see FIGS. 3 and 4).

According to the invention, the plant 1—rather than providing for purifying the leachates and, once purified, reintroducing said leachates into the external environment—advantageously provides a recirculating arrangement 17 for recirculating the leachates generated in the bio-oxidation station 5 into the plant 1, namely into the biofilter 11 of the biofiltering station 9.

To this purpose, a collecting arrangement 19, which collects the leachates generated in the waste heap 100, and a transferring arrangement 21, which transfers said leachates from the bio-oxidation station 5 to the biofiltering station 9 are arranged below the heap waste 100 subjected to bio-oxidation, said transferring arrangement including, in a per se known manner, pumps, ducts and manifolds suitable for this purpose.

The leachates, once transferred to the biofiltering station 9, are introduced into the biofilter 11.

Figure 2:
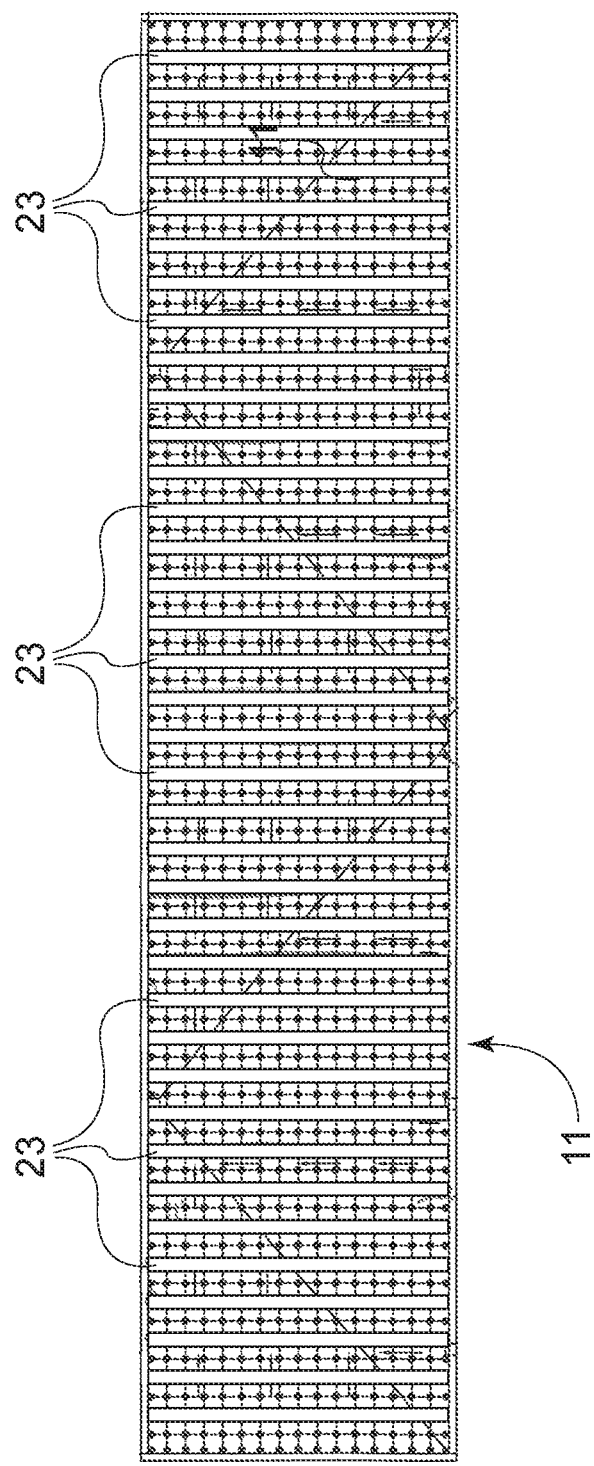
FIG. 2 is a plan view of the biofiltering station of the plant of FIG. 1.

With reference to FIGS. 2-4, leachates are preferably introduced into said biofilter 11 so as to achieve a submerged irrigation of the filtering material of said biofilter.

To this purpose, the leachate recirculating arrangement 17 comprises a plurality of pipes, each provided with a plurality of holes or nozzles for the introduction of the leachates into the filtering material.

The pipes 23 are preferably arranged in a same plane, parallel to the floor of the biofilter 11 and situated at an intermediate height or level with respect to the overall height of said biofilter.

As visible in particular in FIGS. 3 and 4, said pipes 23 can be laid on a first layer of filtering material and covered by a second layer of filtering material. For example, for a biofilter 11 with a filtering bed having a height comprised between 1.4 and 1.8 m, said pipes 23 can be laid on a first layer of filtering material having a height of 50-100 cm and covered by a second layer of filtering material also having a height of 50-100 cm. Thanks to this configuration, a kind of "submerged irrigation" system for the biofilter can be obtained, said system co-operating with a traditional irrigation system (not shown), which irrigates the filtering material from the above, of the biofiltering station 9.

Advantageously, due to the fact that the pipes 23 are arranged at an intermediate height inside the biofilter 11, recirculating the leachates does not increase the malodorous emissions of the biofilter, since the emissions coming from the leachates are filtered by the layer of filtering material arranged above the plane in which the pipes 23 lie.

The pipes 23 are preferably arranged on the filtering material with the interposition of a supporting net, such as an electro-welded net, preventing excessive displacements or misalignments of the pipes in the biofilter.

Said pipes will preferably be arranged parallel to one another, at a distance comprised, for example, between 30 and 120 cm.

According to an alternative embodiment of the invention, it could also be envisaged to arrange the pipes of the leachate recirculating arrangement 17 in several planes inside the filtering bed of the biofilter 11, with the interposition of respective layers of filtering material.

In a preferred embodiment of the invention, said pipes are made as drip pipes 23, i.e. as pipes provided with a very high number of very small holes, so as to obtain a distribution as homogeneous and dispersed as possible of the leachates within the filtering material ("micro-irrigation").

It is to be noted that the leachate recirculating arrangement 17 may include a filtering device suitable for intercepting solid particles suspended in the leachates before introduction of said leachates into the biofilter 11.

The provision of said filtering device is particularly useful when the pipes 23 are made as drip pipes, as the presence of solid particles in the recirculated leachates could entail clogging of the holes of said pipes.

Said filtering device could also be replaced by another kind of device suitable for separating the solid particles suspended in the leachates.

Furthermore, still to the purpose of avoiding clogging of the holes or nozzles of the pipes 23 (especially in the case of drip pipes 23), means for draining and cleaning said pipes can be provided; for example, a draining valve can be provided at the end of each pipe 23.

In alternative embodiments of the invention, the pipes of the leachate recirculating system 17 may be made in a different form, for instance in the form of pipes provided with spraying nozzles.

With particular reference to FIG. 3, it is to be noted that the biofilter 11 generates leachates as well, said leachates being generated, in particular, by meteoric precipitations and/or excessive irrigation of the biofilter itself by the traditional irrigation system of the biofiltering station 9. To this purpose, the biofiltering station 9 is usually provided with a collecting pit 25 for collecting said leachates.

Advantageously, said collecting pit 25 of the biofiltering station 9 can be connected to the leachate recirculating arrangement, so that also the leachates generated in the biofiltering station can be recirculated into the biofilter and they do not have to be disposed of in the external environment.

It is evident from the above description that the invention achieves the objects set forth above.

Indeed, it allows to avoid the need for complex and expensive purifying stations for the leachates. On the contrary, it advantageously allows to exploit said leachates for increasing the humidity of the filtering material of the biofilter.

It is also evident that the above detailed description of an embodiment of the invention has been given merely by way of example and several modifications and variants within the reach of the person skilled in the art are possible, without departing from the scope of protection as defined by the appended claims.

The invention claimed is:

1. A plant for waste disposal comprising:
   a waste treatment station, in which waste is subjected to a biological and/or mechanical treatment, with leachates being generated in the waste treatment station and aerial effluents being generated in the waste treatment station;
   a biofiltering station comprising a biofilter, which comprises a filtering bed of filtering material and in which the aeriform effluents coming from the waste treatment station are filtered before being released into the external environment; and
   a leachate recirculating arrangement for recirculating into the filtering bed of the biofilter of the biofiltering station the leachates generated in the waste treatment station.

2. The plant according to claim 1, wherein the leachate recirculating arrangement comprises a collecting arrangement for collecting the leachates in the waste treatment station, and a plurality of pipes provided with holes or nozzles for introducing the leachates into the biofilter.

3. The plant according to claim 2, wherein the filtering bed of filtering material has a given height and wherein the pipes are laid on a first layer of filtering material of the filtering bed and covered by a second layer of filtering material of the filtering bed.

4. The plant according to claim 2, wherein the pipes are drip pipes.

5. The plant according to claim 2, wherein a filter suitable for intercepting solid particles suspended in the leachates is arranged upstream of the pipes.

6. The plant according to claim 1, wherein a collecting pit for collecting leachates generated in the biofiltering station is provided in said biofiltering station and wherein the leachate recirculating arrangement is in communication with the collecting pit, whereby the leachates generated in the biofiltering station are also recirculated into the biofilter.

7. The plant according to claim 2, wherein the pipes are arranged in several planes inside the filtering bed of the biofilter, with interposition of layers of filtering material between the planes on which the pipes lie.

8. A plant for waste disposal, comprising:
   a bio-oxidation station, in which waste, arranged in heaps, is arranged on an aerated flooring, through which air is blown into the heaps or sucked through the heaps, with leachates being generated in the bio-oxidation station;
   a biofiltering station comprising a biofilter, which comprises a filtering bed formed by one or more layers of filtering material and through which the air coming from the bio-oxidation station passes before being released into the external environment; and
   a recirculating arrangement for recirculating the leachates generated in the bio-oxidation station into the layer of filtering material of the biofilter of the biofiltering station.

9. The plant according to claim 8, wherein the leachate recirculating arrangement comprises a plurality of pipes, each provided with a plurality of holes or nozzles for the introduction of the leachates into the layer of filtering material of the biofilter of the biofiltering station.

10. The plant according to claim 9, wherein the pipes are laid on a first layer of filtering material and covered by a second layer of filtering material.

11. The plant according to claim 9, wherein the pipes are arranged in several planes inside the filtering bed of the biofilter, with interposition of layers of filtering material between the planes on which the pipes lie.

12. The plant according to claim 8, wherein a collecting pit for collecting leachates generated in the biofiltering station is provided in said biofiltering station, and wherein the leachate recirculating arrangement is in communication with the collecting pit, whereby the leachates generated in the biofiltering station is also recirculated into the biofilter.

13. A method for waste disposal, comprising the steps of:
   treating waste in a waste treatment station, in which waste is subjected to a biological and/or mechanical treatment, during which leachates are generated and aerial effluents are generated;
   biofiltering the aerial effluents of the waste in a biofiltering station comprising a biofilter, which comprises a filtering bed of filtering material and in which the aeriform effluents coming from the waste treatment station are filtered before being released into the external environment; and
   recirculating the leachates generated in the waste treatment station into the filtering bed of the biofilter of the biofiltering station with a leachate recirculating arrangement.

14. The method according to claim 13, wherein said step of recirculating the leachates comprises a sub-step of collecting the leachates generated by the waste, a sub-step of transferring the leachates to the biofilter, and a sub-step of introducing the leachates into the biofilter.

15. The method according to claim 14, wherein the filtering bed of filtering material has a given height, and wherein the leachate recirculating arrangement includes pipes laid on a first layer of filtering material of the filtering bed and covered by a second layer of filtering material of the filtering bed, and wherein said sub-step of introducing the leachates into the biofilter provides for introducing the leachates into the filtering bed via the pipes.

16. The method according to claim 14, wherein said sub-step of introducing the leachates into the biofilter provides for introducing the leachates into the biofilter through a plurality of drip pipes.

17. The method according to claim 14, further comprising, upstream of said sub-step of introducing said leachates into said biofilter, a step of separating solid particles from the leachates before introducing the leachates into the biofilter.

18. The method according to claim 13, wherein further leachates are generated in the biofilter, and further comprising a step of recirculating into the biofilter the leachates generated in the biofilter.

* * * * *